United States Patent [19]

Murayama et al.

[11] Patent Number: 4,764,813

[45] Date of Patent: Aug. 16, 1988

[54] VARIABLE ORDER AND PERIOD SOLID STATE IMAGE PICKUP DEVICE

[75] Inventors: Jin Murayama; Ryuji Kondo; Yoshimitsu Kudoh, all of Kanagawa, Japan

[73] Assignee: Fuji Photo Film Co., Ltd., Kanagawa, Japan

[21] Appl. No.: 909,542

[22] Filed: Sep. 22, 1986

[30] Foreign Application Priority Data

Sep. 20, 1985 [JP] Japan ................................ 60-206256
Sep. 27, 1985 [JP] Japan ................................ 60-212660

[51] Int. Cl.$^4$ ........................ H04N 5/335; H04N 9/07
[52] U.S. Cl. ................................ 358/213.11; 358/41; 358/44; 358/213.27
[58] Field of Search ................ 358/41, 43, 44, 213.11, 358/213.27, 213.29

[56] References Cited

U.S. PATENT DOCUMENTS 4,641,183  2/1987  Kinoshita .............................. 358/44
4,658,287  4/1987  Chen ..................................... 358/44

Primary Examiner—Michael A. Masinick
Attorney, Agent, or Firm—Sughrue, Mion, Zinn, Macpeak and Seas

[57] ABSTRACT

A color sensor array in which vertical output lines correspond to different colors. The reading order and the reading periods for each color are adjusted in one of two ways. Separate vertical shift registers are provided for each color and the separate vertical shift registers are selectively enabled. Alternatively all color are simultaneously read but the color lines are selectively coupled to one output line.

7 Claims, 4 Drawing Sheets

VARIABLE ORDER AND PERIOD SOLID STATE IMAGE PICKUP DEVICE

BACKGROUND OF THE INVENTION

1. Field of the Invention

This invention relates to a solid state image pickup device comprising a solid state image sensor including a light receiving section having photoelectric conversion elements arranged in a matrix form, a charge transferring section and a transfer control section and mosaic or stripe type microfilters arranged on the light receiving section in correspondence to picture elements. Generally stating, the terms "solid state image sensor" and "solid state image pickup device" mean the same thing. However, for convenience in description, the term "solid state image sensor" as used herein is intended to mean one for monochromatic light which is used to detect only an image brightness, and the term "solid state image pickup device" as used herein is intended to mean one which is combined with microfilters for color images.

More specifically, this invention relates to a solid state image pickup device in which the order of reading photoelectric conversion elements can be changed in a predetermined range, and the periods of reading the photoelectric conversion elements are given with priority in a predetermined range.

2. Description of the Prior Art

A MOS type image pickup device comprises, as shown in the example of FIG. 1, photoelectric conversion elements 1, vertical switches 3, horizontal switches 2, a vertical shift register 5 and a horizontal shift register 4, as is well known in the art. In FIG. 1, a stripe type microfilter is provided to the photoelectric conversion elements 1 such that each element in a column is covered by the same color microfilters but the colors vary from column to column. In the MOS type image pickup device, especially a MOS type area sensor, the order of reading the photoelectric conversion elements are unequivocally determined, and the periods of reading the elements are equal to one another.

However, in the case of a solid state image pickup device for color pictures in which a mosaic type microfilter is placed on the photoelectric conversion elements, in order to balance the signal strengths of three primary colors, red, green and blue as well as the transmittances of the elements of the microfilter, it is highly desirable to change the reading period for every color. In each of the photoelectric conversion elements, the period in which no reading operation is carried out corresponds to the charge accumulating period, and therefore if the reading period can be made relatively short, then the charge stored is increased as much.

On the other hand, for a special purpose, sometimes it is required to obtain a monochromatic light picture signal for red, green or blue from a color picture solid state image pickup device.

However, these requirements cannot be satisfied by the conventional MOS type area sensor.

SUMMARY OF THE INVENTION

Accordingly, an object of this invention is to provide a solid state image pickup device simple in construction, in which in a certain range, for instance in the range of three adjacent photoelectric conversion elements, the order of reading the signals and the periods of reading the signals can be changed. It should be noted that the changing of the signal reading periods includes setting the reading period to zero, i.e., it includes the method in which, in the case where, for instance, three adjacent photoelectric conversion elements form a group, at least one of the elements is not subjected to the reading operation.

According to the present invention, the above and other objects of the invention is accomplished by selecting either the control inputs to a line of switches or by selecting one of parallel reading lines. The selection of the control inputs can be accomplished by using three parallel shift registers and selectively enabling their outputs. The selection of the reading lines can be accomplished by parallel switches.

BRIEF DESCRIPTION OF THE INVENTION

DESCRIPTION OF THE PREFERRED EMBODIMENTS

The first embodiment of the present invention will be described with reference to FIGS. 2 to 4.

Figure 2:
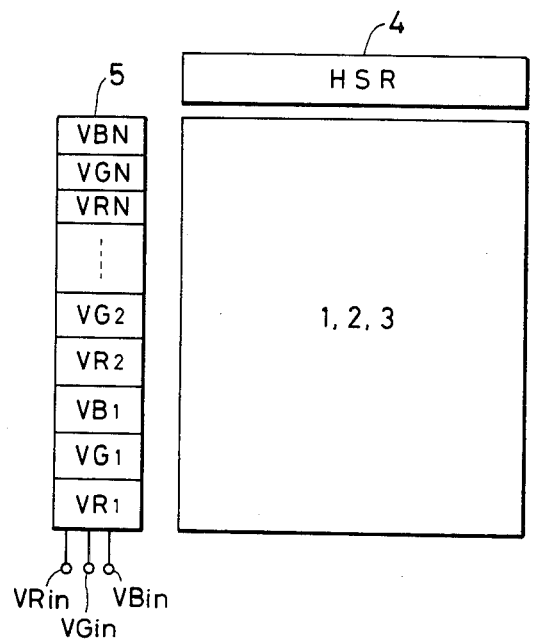
FIG. 2 is a block diagram outlining the arrangement of a solid state image pickup device according to the present invention.

FIG. 2 is a block diagram outlining the arrangement of a solid state image pickup device according to the present invention, in which photoelectric conversion elements 1, horizontal switches 2 and vertical switches 3 are shown as a block because they are conventional. The connections between the photoelectric conversion elements 1 and the vertical switches are shown in FIG. 3. Furthermore, a horizontal shift register 4 is also a conventional one, and the connections between the horizontal shift register 4 and the horizontal switches 2 are accomplished in a conventional manner, as shown in FIG. 3.

A vertical shift register 5 comprises three groups of shift register units. In FIG. 2, reference characters $VR_1$, $VR_2$, --- and $VR_N$ designate the first group of shift register units, $VG_1$, $VG_2$, --- and $VG_N$ designate the second group of shift register units, and $VB_1$, $VB_2$, --- and $VB_N$, the third group of shift register units. These shift register units are connected to the vertical switches 3 in a conventional manner, as shown in FIG. 3. The shift register units are responsive to a common clock signal CL.

In the embodiment, being described the vertical shift register 5 is provided with three selective input terminals $VR_{in}$, $VG_{in}$ and $VB_{in}$, respectively for the first, second and third groups of the shift register units. When a signal is supplied to one of the three selective input terminals for instance $VR_{in}$, one of the groups of the shift resister units, for instance $VR_m$ (m=1, 2, --- and N) provide outputs. That is, if the input signal is supplied to one of the selective input terminals while the shifting operation is carried out through the vertical shift register 5, then it is possible to cause a desired one of the three groups to provide outputs. The result is that the vertical shift register 5 is effectively composed of three parallel shift register groups, one per color, which are shifted in parallel by a common clock. However, the outputs of the shift register groups are separately enabled by the three selective input terminals $VR_{in}$, $VG_{in}$ and $VB_{in}$. Accordingly, in each of the three units $VR_m$, $VG_m$ and $VB_m$, the order and the period of outputting signals can be controlled as desired. Furthermore, as it is possible to set the period to zero, it is possible to cause only one or two of the three cells $VR_m$, $VG_m$ and $VB_m$ to provide outputs.

The arrangement of the selective input terminals is not limited only to that which has been described above. For instance, instead of the three selective input terminals, two selective input terminals may be employed, because it is sufficient for the selective input terminals selecting any one of the three states to receive two-bit data.

Figure 1:
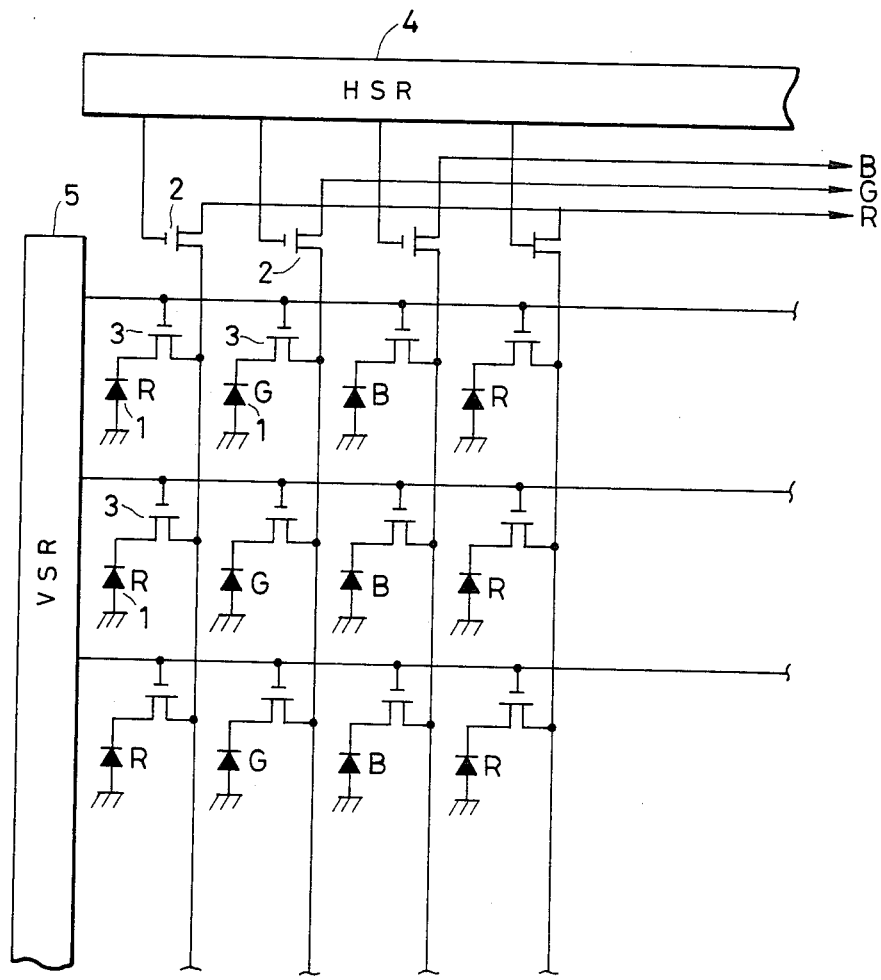
FIG. 1 is a diagram showing a conventional solid state image pickup device having a stripe type microfilter.
Figure 3:
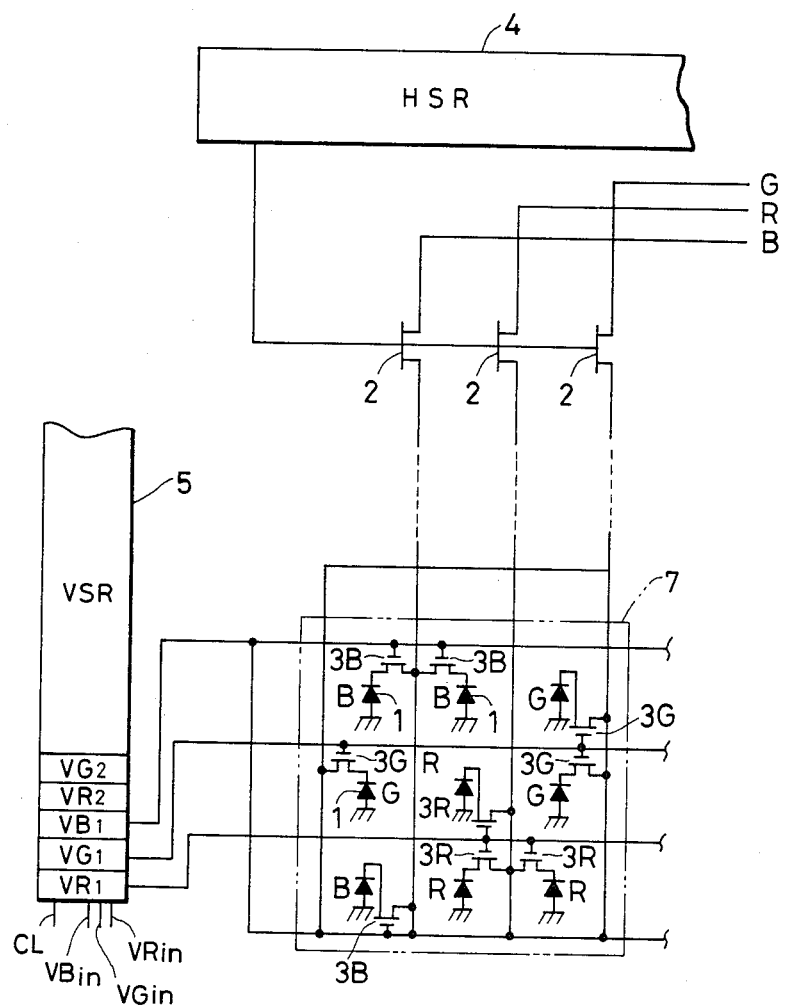
FIG. 3 is a diagram showing an example of the solid state image pickup device of the present invention.

FIG. 3 is a circuit diagram showing the first embodiment of the present invention shown in FIG. 2 in more detail. As is clear from FIG. 3, the number of groups of the shift register units in the vertical shift register 5 is three so as to correspond to the number of primary significant basic colors. It should be noted that the number of groups of the shift resister units in the vertical shift register is preferably two to four. FIG. 3 shows the light receiving section having a plurality of units 7 arranged in matrix form, each unit including nine photoelectric conversion elements 1. In the embodiment shown in FIG. 3, the first unit $VR_1$ in the first group is connected to vertical switches 3R in the first line, the first cell $VG_1$ in the second group to vertical switches 3G in the second line, the first cell $VB_1$ in the third group to vertical switches 3B in the third line, the second cell $VR_2$ in the first cell to the vertical switches in the fourth line, and so forth. As is obvious from FIG. 3, the association of the vertical switches 3 and their photoelectric conversion elements 1 with the lines of the different colors is considerably more complex than the arrangement of FIG. 1. In this case, the shift registers in the first, second and third groups provide outputs in a desired order separately according to signals applied to the selective input terminals $VB_{in}$, $VG_{in}$ and $VR_{in}$.

With such a solid image pickup device as shown in FIG. 3, in response to a control signal applied to at least one of the selective input terminals the order of reading signals from the photoelectric conversion elements of a plurality of lines, three lines in this case, and the periods of reading the signals can be changed as desired. Therefore, in the case where the invention is applied to color picture area sensor for instance, the charge storing periods of red, green and blue can be controlled separately, and also monochromatic light pictures obtained through color separation can be formed.

Figure 4:
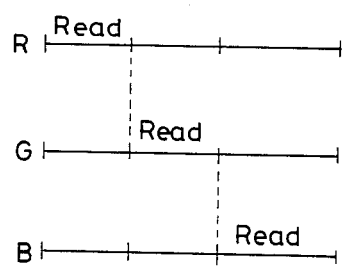
FIG. 4 is a brief time chart indicating the timing of output signals.

FIG. 4 indicates the timing of color picture signals read out of the color picture solid state image device according to the present invention. The respective color signals are outputted on the vertical lines at the positions indicated by "Read". As indicated in FIG. 4, the B signal reading period is somewhat longer than the R or G signal reading period, and accordingly the charge accumulating period for the R or G signal is somewhat longer than that for the B signal.

While the present invention is described with reference to the vertical shift register, it is obvious that the same means can be applied to the horizontal shift register, and it goes without saying that the means is applicable to both of the vertical and horizontal shift registers. However, it is unnecessary to describe the techniques separately in detail, because they are substantially equivalent to one another. And it is also obvious that these techniques also fall within the spirit and scope of the invention.

Figure 5:
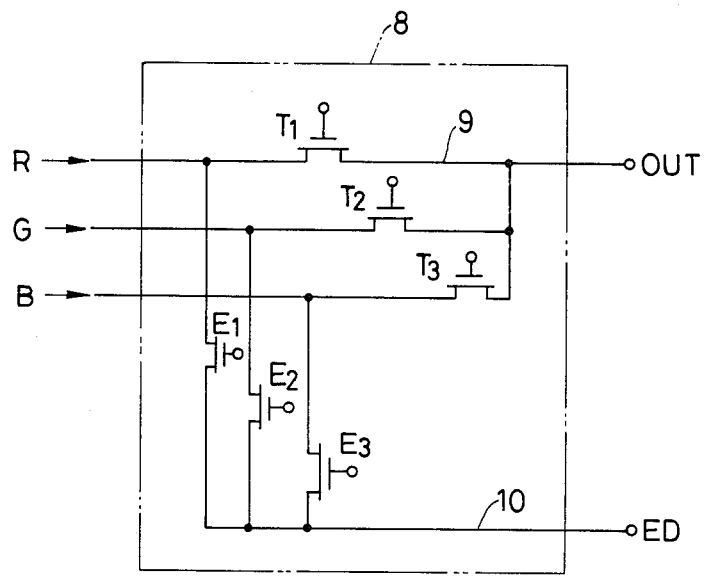
FIG. 5 is a circuit diagram showing another example of the solid state image pickup device of the present invention.
Figure 6:
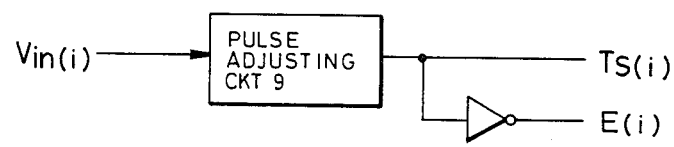
FIG. 6 is a circuit diagram showing a signal processing circuit to be used in the second embodiment.

The second embodiment of the present invention will be described with reference to FIGS. 5 and 6. The second embodiment of the present invention is obtained by modifying an output end of the solid state image pickup device.

More specifically, the vertical shift register 4 is a conventional one with only one group of shift register units. Each shift register unit then controls the vertical switches 3 of three lines. That is, all the vertical switches 3 of a particular light receiving section unit are controlled by one shift register unit. The signals which are to be applied to the selective input terminals of the horizontal shift register 5 are applied through a pulse width adjusting circuit 8 to the output end of the solid state image pickup device, so that the signal selection of desired signals and the adjustment of the order and the period of reading the signals from the photoelectric conversion elements can be accomplished. In this case, the pulse width is adjusted so as to have the pulse width corresponding to the scanning period for one picture in a pulse adjusting circuit 9, shown in FIG. 6, which may be a monstable-multivibrator with an adjustable pulse width. There is one such circuit 9 as in FIG. 6 for each color. The inputs to these pulse adjusting circuits 9 correspond to the inputs of the vertical shift register 5 of FIGS. 2 and 3.

The outputs of different colors separated by microfilters are obtained in the same manner as in the first embodiment. As shown in FIG. 5, the outputs of R, G and B (red, green and blue) are applied to the sources of transferring FETs T1, T2 and T3, respectively, whose drains are connected to one output line 9, so that the outputs are read out through the single output line 9. The outputs of R, G and B are further applied to the sources of eliminating FETs E1, E2 and E3, respectively, whose drains are connected to one eliminating line 10 which is connected to an eliminating drain terminal ED. The eliminating drain terminal ED is connected to a DC voltage source, otherwise used as a reference potential for reading the photoelectric conversion elements 1, when it is desired to reset the unread photoelectric conversion elements 1. If the eliminating drain terminal ED is left at a floating potential, the unread photoelectric conversion elements 1 are not reset but can be thereafter read.

When, in the embodiment, being described it is required to read out the output of R, the transistors are so controlled that the transferring FET T1 and the eliminating FETs E2 and E3 are conductive (H), while the transferring FETs T2 and T3 for the outputs of the other colors G and B and the eliminating FET E1 for the output of R are non-conductive (L).

Similarly as in the case of reading out the output of R, in reading out each of the outputs of the remaining colors G and B, the transferring FET for the desired color and the eliminating FETs for the other colors are rendered conductive while the transferring FETs for the other colors and the eliminating FET for the aimed color are rendered non-conductive.

In the above-described embodiment, the three colors, R, G and B, are employed. However, it should be noted that the invention is not limited thereto or thereby. That is, it goes without saying that the technical concept of the invention is applicable to the case where three other colors are employed, or the number of colors are increased or decreased.

As is apparent from the above description, according to the present invention, the order and the period of reading the signals of the photoelectric conversion elements can be changed as desired according to the control signals applied to the selective input terminals. Therefore, when the invention is applied to a color picture area sensor for instance, the picture signals of a desired color can be obtained. And it is also possible to obtain monochromatic light picture signals.

What is claimed is:

1. A solid state image pickup device comprising a plurality of photoelectric conversion elements arranged in a matrix form, vertical switches provided for said photoelectric conversion elements, horizontal switches provided for said photoelectric conversion elements, a vertical shift register comprising shift register units, for controlling said horizontal switches, coupled to at least one of said vertical shift register and said horizontal shift register, for altering the sequence of outputs from the shift register units to thereby selectively determine the order of energizing said photoelectric conversion elements, whereby the sequence of the output signals from said photoelectric conversion elements can be selectively varied by altering the output sequence from said shift register units.

2. The device as defined in claim 1 wherein said vertical shift register comprises a plurality of groups of shift register units, each group of shift register units being connected to a selected output terminal of said altering means, so that in response to signals applied to said selected output terminals, said groups of shift register units are selectively caused to provide output signals to activate selected ones of said vertical switches.

3. The device as defined in claim 2, wherein control inputs of all vertical switches in a line of said photoelectric conversion elements are controlled by a separate unit of one of said groups of shift register units.

4. The device as defined in claim 3, further comprising a matrix of color filters overlying said photoelectric conversion elements.

5. The device as defined in claim 1 wherein said means for altering further comprises means for selectively controlling duration of the outputs from said shift register units to thereby selectively control the duration of the output signals from said photoelectric conversion elements.

6. The device as defined in claim 5, wherein said selecting means at any time selects only one of said output signals from said photoelectric conversion elements to pass to a predetermined output line.

7. The device as defined in claim 6, further comprising a matrix of color filters overlying said photoelectric conversion elements.

* * * * *